(12) United States Patent
Chomsky

(10) Patent No.: US 6,603,792 B1
(45) Date of Patent: Aug. 5, 2003

(54) HIGH POWER PULSED MEDIUM PRESSURE $CO_2$ LASER

(76) Inventor: Doron Chomsky, 4 Gorodesky Street, Rehovot 76227 (IL)

(*) Notice: Subject to any disclaimer, the term of this patent is extended or adjusted under 35 U.S.C. 154(b) by 0 days.

(21) Appl. No.: 09/533,130

(22) Filed: Mar. 23, 2000

(51) Int. Cl.$^7$ .............................. H01S 3/22; H01S 3/03; H01S 3/08; H01S 3/097

(52) U.S. Cl. ............................ 372/87; 372/55; 372/61; 372/92; 372/95

(58) Field of Search ............................ 372/92, 95, 83, 372/87, 90, 10

(56) References Cited

U.S. PATENT DOCUMENTS

| | | | |
|---|---|---|---|
| 3,743,963 A | 7/1973 | Bullis et al. | 331/94.5 |
| 5,097,472 A | 3/1992 | Chenausky | 372/38 |
| 5,148,438 A * | 9/1992 | Remo et al. | 372/37 |
| 5,479,428 A * | 12/1995 | Kuzumoto et al. | 372/61 |
| 5,528,613 A | 6/1996 | Macken et al. | 372/37 |
| 5,596,593 A | 1/1997 | Crothall et al. | |
| 6,215,807 B1 * | 4/2001 | Reilly | 372/57 |

OTHER PUBLICATIONS

Electronics Letters, Feb. 20, 1969, vol. 5, No. 4, Carbon Dioxide Laser with High Power Per Unit Length, pp. 63–64, A. Croker, M.S. Wills.*

Crocker et al, Electronics Letters, Carbon–Dioxide Laser with High Power Per Unit Length, Feb. 20, 1969, vol. 5, No. 4, pp. 66, 64.*

Clyde O. Brown and Jack W. Davis, "Closed–cycle performance of a high–power electric–discharge laser", Appl. Phys. Lett., vol. 21, No. 10, Nov. 15, 1972, pp. 480–481.

N.A. Yatsenko, "Gas Discharge Lasers with Combined Pumping"; W. J. Whitteman and V.N. Ochkin (eds.), Gas Lasers—Recent Developments and Future Prospects, pp. 135–154, 1996.

* cited by examiner

Primary Examiner—Paul IP
Assistant Examiner—Armando Rodriguez
(74) Attorney, Agent, or Firm—Fitch, Even, Tabin & Flannery

(57) ABSTRACT

A $CO_2$ laser utilizing combination of direct current (DC), radio frequency (RF) discharges together with an unstable resonator is disclosed. The combined use of the combination of DC and RF discharges in the laser apparatus allows to provide high power output radiation within a relatively compact design of the apparatus. Consequently, the laser operating efficiency is increased, with a significant lowering of required excitation voltages, and a substantial reduction in excitation hardware. The laser apparatus of the present invention may have durable and reliable construction that is relatively easy and cheap in manufacturing.

11 Claims, 2 Drawing Sheets

HIGH POWER PULSED MEDIUM PRESSURE $CO_2$ LASER

FIELD OF THE INVENTION

This invention relates to gas tube lasers and, in particular, to $CO_2$ lasers utilizing a combined discharge in static and alternating electric fields.

BACKGROUND OF THE INVENTION

Gaseous lasers have found extensive applications in the laser processing industry, including laser cutting, welding of materials, laser hardening through phase transformation, and in medical applications. In particular, in recent years, there has been considerable investigation into various forms of carbon dioxide gas ($CO_2$) lasers, which radiate at wavelengths between 9 and 11 $\mu$m, and may be operated in CW (Continuous Wave) or pulsed regimes. While other gas lasers have efficiency of 0.1% or less, the $CO_2$ laser may have an efficiency up to about 30%.

For excitation of the $CO_2$ lasers (both CW and pulsed), it is known to utilize DC (direct current) continuous electric discharge and/or RF (radio frequency) alternating electric discharge. In conventional cylindrical excited lasers, electric discharge is usually applied longitudinally between DC electrodes disposed at opposite ends of a laser tube, whilst radio frequency (RF) discharge is normally applied across the transverse dimension of the laser tube. On the other hand, in conventional slab lasers only RF discharge is used that is normally applied between the slab electrodes.

The possibility to increase the CW output power of a cylindrical DC and/or RF excited $CO_2$ laser by the design of its geometry is essentially limited, inter alia, due to its output power scaling. In particular, the output power of such a laser may be increased only by increasing the length of the laser cavity and it cannot be increased by increasing the inner diameter thereof due to temperature limitations.

As far as pulsed DC excited cylindrical lasers are concerned, the output power of such lasers cannot be increased by increase of either the laser length or the laser diameter. This is mostly due to their thermal instability associated with the localization of the plasma discharge to a small portion of the inner cavity volume, exciting acoustic oscillations, producing high temperature electrons which decompose the $CO_2$ molecules, whereby the laser beam quality and its pointing stability are deteriorated. These phenomena essentially limit manufacturing of powerful DC excited lasers having compact sizes.

On the other hand, the output power of an either CW and pulsed slab RF excited $CO_2$ laser may be increased, inter alia, by the increase of the inner area of the laser slabs. This feature is essential for fabrication of compact powerful lasers. In addition, by virtue of the use of transverse RF discharge for $CO_2$ laser excitation quite uniform and stable discharge may be produced. However, high power RF operation requires more expensive components, which increase the cost of the transverse RF discharge excitation if high peak powers are required. An utilization of high power RF operation is also limited by a phenomenon that is known as transition of the plasma to $\gamma$-discharge.

It has been suggested in the prior art to utilize combined DC and RF discharges for the excitation of $CO_2$ cylindrical lasers. For example, U.S. Pat. No. 5,097,472 describes a laser in which the same electrodes are used in-turn for the application of the RF and DC discharges. Further, U.S. Pat. No. 5,596,593 discloses a $CO_2$ laser in which different DC and RF electrodes are used, and the RF discharge is applied orthogonally to the DC discharge, both discharges being directed transversely to the longitudinal axis of the laser. Another yet laser apparatus also utilizing the combination of DC and RF discharges is described by Yatsenko N. A. "Gas Discharge Lasers with Combined Pumping," Gas Laser-Recent Development and Future Prospects", 1996, pp. 135–154. In the latter laser, a primary DC electric discharge is spread over the laser tube longitudinally between a pair of electrodes disposed adjacent the opposite ends thereof. The RF discharge is applied transversely along the diametric dimension of the laser tube. Such configuration of the laser results, inter alia, in the reduction of consumed RF power at the expense of the increased consumption of cheaper DC power, and also in the increase of laser efficiency, and in the improved uniformity of the excitation of the gas medium.

The prior art cylindrical lasers utilizing a combined DC and RF discharge operate with optically stable resonators that normally comprise, disposed at opposite ends of a laser cavity, a highly reflective output mirror which functions both to reflect internal radiation beams into the laser cavity and to transfer an output radiation beam exiting out of the laser cavity, and a feedback mirror. The two mirrors allow the internal beams to numerously oscillate inside the laser cavity in order to get high gain and improved directionality of the output beam. However, if the output beam is too intense (laser power larger than 2 kW), the output mirror may suffer breakage that may cause shut down of the beam production.

In addition, a problem exists with the use of optically stable resonators in lasers where high output power is achieved by the increase of the laser tube inner diameter. Namely, it is known that an optically stable resonator operates in a multi-mode regime and produces a low quality laser beam, when its Fresnel number $N_F = \alpha^2/(\lambda L)$ exceeds the value of 3, where $\alpha$ is a radial dimension of an exposed output mirror surface, $\lambda$ is the wavelength of radiation inside the resonator, and L is the resonator length.

It has been known in the prior art to provide a powerful laser equipped with an unstable optical resonator with a relatively large Fresnel number ($N_F > 3$). The unstable resonator has primary and feedback mirrors, wherein the primary mirror is of a larger diameter than the feedback mirror so that the output radiation reflected from the periphery of the primary mirror is directed out of the laser cavity in a ring shaped beam surrounding the feedback mirror. The unstable resonator produces high optical quality beam, which may extract energy out of the entire gain volume. Furthermore, in view of the fact that the number of times the laser beam passes the laser cavity is small, the use of optically unstable resonators requires a specific care to be taken of the gain in the laser medium.

It is generally known that, in a gas laser having an unstable resonator, the gain may be enhanced by the increase of the gas pressure. However, usage of high pressure in pulsed lasers normally decreases the pulse repetition frequency since the gas needs a relatively long time in order to recover. Hence, conventional pulsed lasers having an unstable resonator cannot operate with high pressure and, therefore, pulses provided thereby are normally of relatively small averaged power, that inevitably limits their applications.

It is the object of the present invention to provide a new gas laser.

SUMMURY OF THE INVENTION

In accordance with the present invention, there is provided a cylindrical laser apparatus comprising:

(a) a laser chamber including an elongated discharge region extended along a longitudinal axis of the laser apparatus and containing an active medium to be excited in the discharge region so as to emit photons of induced radiation;

(b) a pair of DC electrodes facing toward the discharge region and arranged at opposite ends thereof, for the provision of a longitudinal DC discharge in the discharge region;

(c) a pair of RF electrodes facing toward the discharge region and arranged alongside the discharge region, for the provision of a transverse RF discharge therein;

(d) an unstable resonator including a primary mirror and a feedback mirror, the mirrors being disposed at said ends of the discharge region along its axis for forming an outlet beam of the radiation induced by the DC and RF discharges.

The laser apparatus in accordance with the present invention is preferably a $CO_2$ laser.

Utilizing the combination of DC and RF discharges in the laser apparatus of the present invention, high power output radiation in general and, particularly, high power pulsed radiation may be provided with a relatively compact design of the apparatus. Consequently, the laser operating efficiency is increased, with a significant lowering of required excitation voltages, and a substantial reduction in excitation hardware. Moreover, in addition to these advantages, as well as other advantages of the DC and RF discharge lasers mentioned heretofore, the combined use of the DC and RF discharges is capable of creating a discharge having an improved stability and uniformity and high density of the electric energy. In particular, the density of the electric field that may be obtained by the combined use of the DC and RF discharges may reach 200 W/cm³. Such a high density of the electric energy provides for an increased gain in the discharge region at medium pressures of the laser gas, enabling thereby the use of the optically unstable resonator with pulses in a rather broad region of duration of 0.05–1 msec.

The laser apparatus of the present invention may have durable and reliable construction that is relatively easy and cheap in manufacturing.

BRIEF DESCRIPTION OF THE DRAWINGS

In order to understand the invention, its operating advantages and to see how it may be carried out in practice, preferred embodiments will now be described, by way of non-limiting example only, with reference to the accompanying drawings, in which.

DETAILED DESCRIPTION OF PREFERRED EMBODIMENTS

Figure 1:
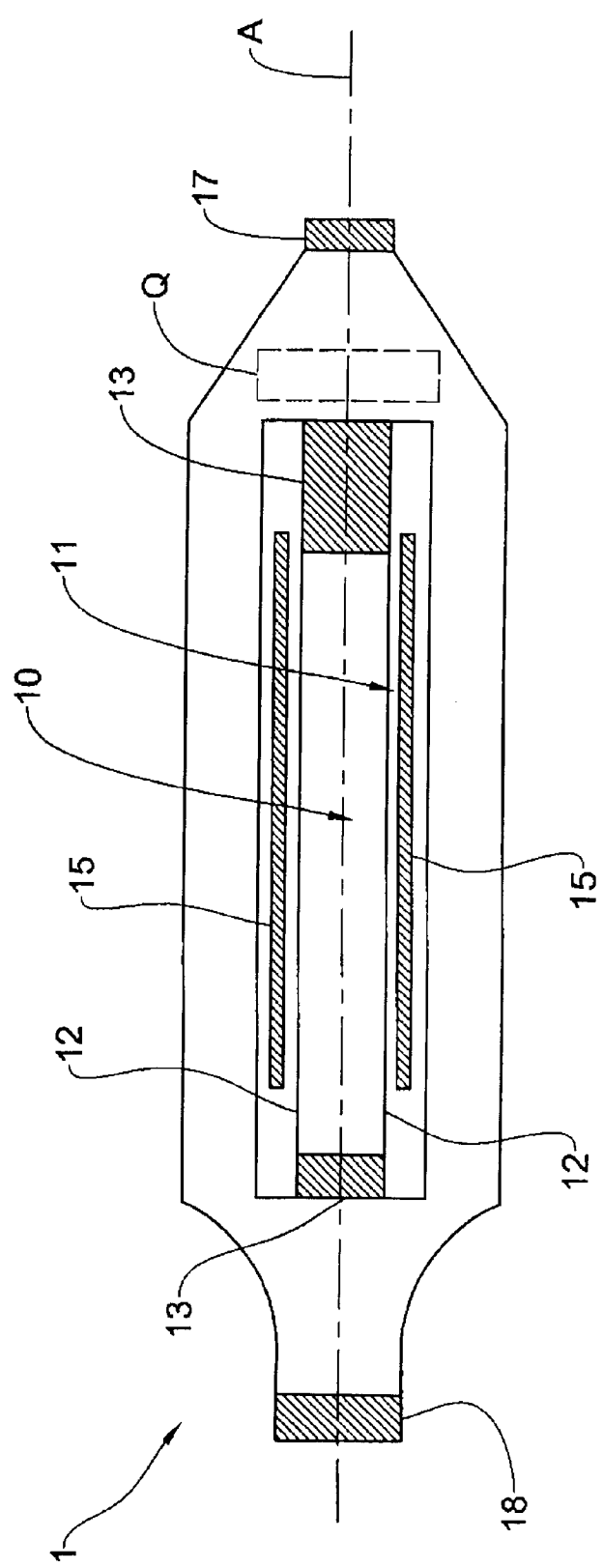
FIG. 1 is a pictorial illustration of a gas laser in accordance with the present invention.

Referring to FIG. 1, there is shown for the purpose of illustration, a gas discharge laser 1 of the present invention, preferably designed to operate in a pulsed mode.

The laser includes a laser chamber 10 with an elongated discharge region 11 extended along a longitudinal axis A of laser 1. The discharge region contains an active medium in the form of a laser gas at a predetermined pressure, e.g. in the range from about 15 Torr to about 25 Torr, disposed therein so as to emit photons of induced radiation when excited. The active medium may be any appropriate laser gas. As a specific example, the laser gas may be a $CO_2$ laser gas mixture comprising about 60–70% He, about 10–20% $N_2$, about 5–10% $CO_2$, about 1–2% Xe, about 0.5% CO, and about 0.5% $H_2$ by mole fraction, although it should be understood that other laser gases and gas mixtures also may be employed.

The laser chamber has inner walls 12 made of electrically insulating and vacuum preserving material. For example, this material can be either Pyrex or other kinds of glass or ceramic materials like Allumina or Berilia.

The laser further includes a pair of DC electrodes 13, connected with a suitable DC voltage source (not shown), arranged at opposite ends of the chamber and facing toward discharge region 12, for the provision of a longitudinal DC discharge in the discharge region, to cause a population inversion in the active medium. The DC electrodes may have any appropriate design, e.g. their major surfaces may be planar and oriented perpendicular to the longitudinal axis of the laser.

The laser further includes a pair of substantially parallel RF electrodes 15 connected with a suitable RF voltage source (not shown), arranged at two diametrically opposite positions of the laser chamber and facing in the direction of the discharge region, for the provision of a transverse RF discharge therein. The RF electrodes may have any appropriate design, e.g. the major surface(s) of each of them may extend parallel to the longitudinal axis of the laser.

The DC electrodes 13 are constructed of a conductive substance, usually a metal, where the conductive substance is directly exposed to the discharge region 12. The RF electrodes 15 may also be constructed of a metal, but they should not be directly exposed to the discharge region 12, being rather separated therefrom by insulating material. For example, the RF electrodes may be mounted on or within the inner walls of laser chamber 11.

The laser further includes an unstable resonator formed of a primary mirror 17 and a feedback mirror 18 used as an output coupler, and having an optical axis coinciding with the longitudinal axis A. The mirrors 17 and 18 are disposed at two ends of the discharge region 12 so as to ensure that the radiation induced in the discharge region is reflected from the feedback mirror 18 towards the primary mirror 17 and further reflected from the periphery of the primary mirror as an outlet radiation beam surrounding the feedback mirror.

The unstable resonator may be of a negative or positive branch type, that are both known per se. In the former case, primary mirror 17 and feedback mirror 18 are concave mirrors, and in the latter case primary mirror 17 is a concave mirror and feedback mirror 18 is a convex mirror.

Figure 2:
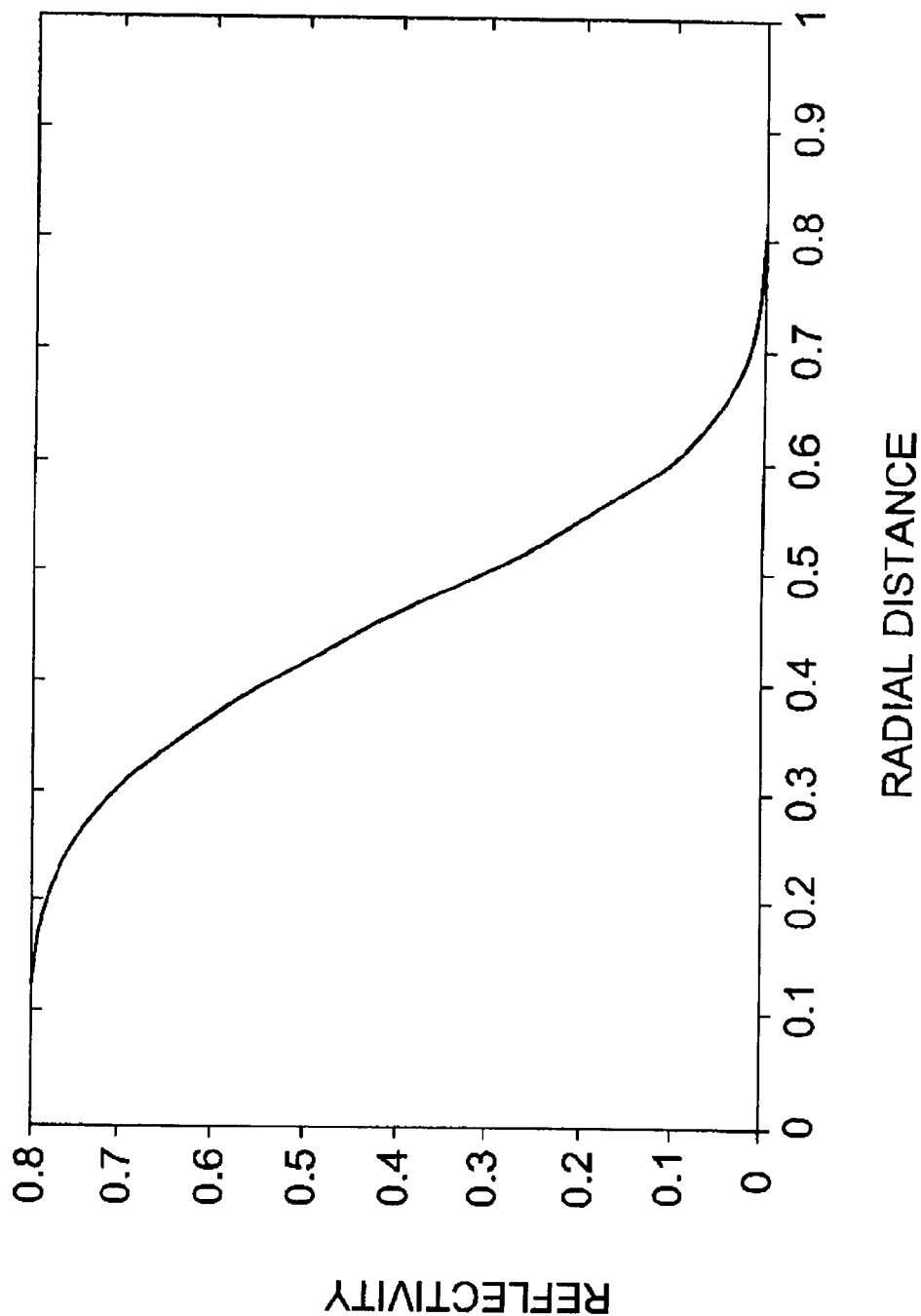
FIG. 2 is a typical curve of reflectivity versus radius of the feedback mirror of an unstable resonator of the gas laser of the present invention.

The feedback mirror 18 has, preferably, a graded index of reflectivity mirror, where the radial dependence of the reflectiviiy is given by a supergaussian function. A typical geometric representation of such dependence for a negative branch unstable optical resonator is shown in FIG. 2. The unstable optical resonator having the feedback mirror with graded reflectivity is capable of producing a coherent diffraction limited laser beam with the ability to cover a large cross section laser gain zone, or in physical terms, a laser cavity with a relatively large Fresnel number (preferably more than 3).

As a specific example for illustrative purposes, a pulsed laser constructed according to the above description may have the following specific parameters:

inner radius of the laser chamber—2.5 cm;
length of the laser discharge region—80 cm;
radius $R_1$ of the primary mirror—12 m;
radius $R_2$ of the feedback mirror—10 m;
the distance L between the mirrors—1 m, in order to comply the condition $2L=R_1-R_2$;
DC voltage—in the range of 10 kV to 25 kV;
DC current—about 3–6A;
pulse width—in the range of 20 $\mu$sec to 800 $\mu$sec;
frequency of RF pulsed sinusoidal excitation voltage—13.56 MHz;
amplitude of RF pulsed sinusoidal excitation voltage—about 300V);
parameter $M^2$ that characterizes the beam's quality—less than 1.5.

A laser having the above parameters is expected to provide the output energy in the range of 200 mJ to 400 mJ for the pulse with the width less than 100 $\mu$sec. The averaged pulsed power should be about 30–40W and the peak laser pulsed power was about 3–6 kW for the pulses of 100 $\mu$sec. The resultant gas laser should be operated with considerably high efficiency of about 20%.

Whilst the present invention has been described in terms of several preferred embodiments, the conception, upon which this disclosure is based, may readily be utilized as a basis for the designing of other structures for carrying out the several purposes of the present invention. Hence, for concentrating a large amount of power into a short time period, in accordance with the invention, the laser may further be equipped with a conventional Q-switching technique, as shown by Q in FIG. 1. For, example, the Q-switching technique Q may involve rotating one of the mirrors. As another example, this technique Q may utilize known in the art electro-optic, magneto-optic or acousto-optic modulators placed in the laser cavity. A laser, designed in accordance with the present invention, which is equipped with a Q-switching technique is expected to provide the pulse duration as short as a few.

An additional magnet field may be further applied to the discharge region to facilitate the discharge stability and uniformity.

It is to be understood that the phraseology and terminology employed herein are for the purpose of description and should not be regarded as limiting. Also, it is important, therefore, that the scope of the invention is not to be construed as limited by the illustrative embodiments set forth herein, but is to be determined in accordance with the appended claims.

What is claimed is:

1. A pulsed laser apparatus comprising:
   (i) a laser chamber including an elongated discharge region and having a longitudinal axis extending along and passing through said discharge region, the discharge region containing an active medium to be excited in the discharge region so as to emit photons of induced radiation;
   (ii) a pair of DC electrodes facing toward the discharge region and arranged at opposite ends thereof, for the provision of a longitudinal DC discharge in the discharge region;
   (iii) a pair of RF electrodes spaced from each other and facing each other, both electrodes being located radially remote from the longitudinal axis at two diametrically opposite positions of the laser chamber and facing in the direction toward the longitudinal axis and for the provision of a transverse RF discharge therein; and
   (iv) an unstable resonator including a primary mirror and a feedback mirror, the mirrors being disposed at said ends of the discharge region along its axis for forming an outlet beam of the radiation induced by the DC and RF discharges.

2. The laser of claim 1, wherein said chamber is in the shape of a cylindrical tube.

3. The laser of claim 1, wherein said chamber is sealed.

4. The laser of claim 1, further comprising a Q-switch mounted in said unstable resonator.

5. The laser of claim 1, wherein said lasing active medium is a mixture comprising carbon dioxide ($CO_2$) gas.

6. The laser according to claim 5, wherein the lasing gas pressure is between 15 Torr and 30 Torr.

7. The laser of claim 1, wherein said feedback mirror of said unstable resonator has a graded reflectivity.

8. The laser of any one of the preceding claims, wherein the unstable resonator is of a positive branch type.

9. The laser of any one of claims 1 to 8, wherein the unstable resonator is of a negative branch type.

10. The laser of claim 2, wherein said chamber has a circular cross-section.

11. The laser of claim 1, wherein said RF electrodes are planar.

* * * * *